(12) United States Patent
Hu et al.

(10) Patent No.: US 11,973,589 B2
(45) Date of Patent: Apr. 30, 2024

(54) MODE SWITCHING METHOD, DATA FLOW SPLITTING METHOD, AND APPARATUS

(71) Applicant: HUAWEI TECHNOLOGIES CO., LTD., Guangdong (CN)

(72) Inventors: Xingxing Hu, Shanghai (CN); Wenjie Peng, Shanghai (CN); Rui Wang, Shanghai (CN); Hongping Zhang, Shanghai (CN); Haiyan Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 391 days.

(21) Appl. No.: 17/212,924

(22) Filed: Mar. 25, 2021

(65) Prior Publication Data

US 2021/0211224 A1   Jul. 8, 2021

Related U.S. Application Data

(63) Continuation of application No. PCT/CN2019/106221, filed on Sep. 17, 2019.

(30) Foreign Application Priority Data

Sep. 29, 2018   (CN) .......................... 201811145535.2

(51) Int. Cl.
*H04L 1/00*          (2006.01)
*H04W 28/04*      (2009.01)
(Continued)

(52) U.S. Cl.
CPC ........... *H04L 1/0025* (2013.01); *H04W 28/04* (2013.01); *H04W 76/27* (2018.02); *H04W 80/02* (2013.01); *H04W 84/18* (2013.01)

(58) Field of Classification Search
CPC ...... H04L 1/0025; H04L 45/24; H04W 28/04; H04W 76/27; H04W 80/02; H04W 84/18;
(Continued)

(56) References Cited

U.S. PATENT DOCUMENTS

2010/0265915 A1   10/2010   Sun et al.
2017/0201603 A1   7/2017   Uchino et al.
(Continued)

FOREIGN PATENT DOCUMENTS

CN   104797009 A   7/2015
CN   104935414 A   9/2015
(Continued)

OTHER PUBLICATIONS

3GPP TSG-RAN2 Meeting #100; R2-1712190; Source: OPPO; Title: Discussion on UL duplication control, Reno, USA, Nov. 27-Dec. 1, 2017. (Year: 2017).*
(Continued)

*Primary Examiner* — Mohammed S Chowdhury
(74) *Attorney, Agent, or Firm* — Fish & Richardson P.C.

(57) ABSTRACT

The present disclosure relates to mode switching methods, data flow splitting methods, and apparatus. One example mode switching method includes generating, by a first device, first indication information, where a packet data control protocol (PDCP) entity in the first device is connected to at least two radio link control (RLC) entities in a second device, and sending, by the first device, the first indication information to the second device, where the first indication information is used to indicate that transmission between a first RLC entity in the at least two RLC entities and the PDCP entity in the first device is to be canceled. The second device stops the transmission between the first RLC entity and the PDCP entity based on the first indication information.

16 Claims, 8 Drawing Sheets

(51) Int. Cl.
*H04W 76/27* (2018.01)
*H04W 80/02* (2009.01)
*H04W 84/18* (2009.01)

(58) Field of Classification Search
CPC ... H04W 36/22; H04W 88/085; H04W 76/11; H04W 76/15; H04W 28/06
See application file for complete search history.

(56) References Cited

U.S. PATENT DOCUMENTS

| | | | |
|---|---|---|---|
| 2020/0235869 A1* | 7/2020 | Pradas | H04L 1/1896 |
| 2021/0153218 A1* | 5/2021 | Wang | H04W 72/543 |
| 2021/0243638 A1* | 8/2021 | Bae | H04L 1/08 |
| 2021/0274587 A1* | 9/2021 | Jung | H04W 12/0433 |
| 2021/0297899 A1* | 9/2021 | Baek | H04W 28/06 |
| 2022/0014961 A1* | 1/2022 | Baek | H04L 1/1614 |
| 2022/0158785 A1* | 5/2022 | Wang | H04W 76/12 |

FOREIGN PATENT DOCUMENTS

| | | |
|---|---|---|
| CN | 106162732 A | 11/2016 |
| CN | 107147479 A | 9/2017 |
| CN | 108282248 A | 7/2018 |
| CN | 108370304 A | 8/2018 |
| CN | 108401484 A | 8/2018 |
| EP | 3668253 A1 | 6/2020 |
| KR | 20180103717 A | 9/2018 |
| WO | 2018143600 A1 | 8/2018 |
| WO | 2018174418 A1 | 9/2018 |

OTHER PUBLICATIONS

3GPP TSG-RAN WG2 #100; Tdoc R2-1712928; Source: Ericsson; Title: PDCP duplication for AM operation; Reno, Nevada, USA, Nov. 27-Dec. 1, 2017. (Year: 2017).*
Office Action issued in Chinese Application No. 201811145535.2 dated Mar. 26, 2021, 21 pages (with English translation).
Extended European Search Report issued in European Application No. 19867532.4 dated Oct. 13, 2021, 10 pages.
ZTE, "Consideration on the activation/deactivation of data duplication for CA," 3GPP TSG-RAN WG2 Meeting #98, R2-1704660, Hangzhou, China, May 15-19, 2017, 3 pages.
3GPP TS 38.423 V15.1.0 (Sep. 2018), "3rd Generation Partnership Project; Technical Specification Group Radio Access Network; NG-RAN; Xn application protocol (XnAP) (Release 15)," Sep. 2018, 263 pages.
3GPP TS 38.473 V15.3.0 (Sep. 2018), "3rd Generation Partnership Project; Technical Specification Group Radio Access Network; NG-RAN; F1 application protocol (F1AP) (Release 15)," Sep. 2018, 176 pages.
Huawei, "CR to 38.473 on disable of SRB PDCP duplication," 3GPP TSG-RAN WG3 Meeting#101, R3-185084, Gothenburg, Sweden, Aug. 20-24, 2018, 9 pages.
Huawei et al., "Discussion on Packet Duplication," 3GPP TSG-RAN2 Meeting #99bis, R2-1711115, Prague, Czech Republic, Oct. 9-13, 2017, 4 pages.
Huawei et al., "Discussion on the L2 Impact from Packet Duplication," 3GPP TSG-RAN2 Meeting#100, R2-1713791, Nov. 27-Dec. 1, 2017, 4 pages.
PCT International Search Report and Written Opinion issued in International Application No. PCT/CN2019/106221 dated Dec. 19, 2019, 18 pages (with English translation).

* cited by examiner

MODE SWITCHING METHOD, DATA FLOW SPLITTING METHOD, AND APPARATUS

CROSS-REFERENCE TO RELATED APPLICATIONS

This application is a continuation of International Patent Application No. PCT/CN2019/106221, filed on Sep. 17, 2019, which claims priority to Chinese Patent Application No. 201811145535.2, filed on Sep. 29, 2018. The disclosures of the aforementioned applications are hereby incorporated by reference in their entireties.

TECHNICAL FIELD

This application relates to the field of wireless communications technologies, and in particular, to a mode switching method, a data flow splitting method, and an apparatus.

BACKGROUND

To improve transmission reliability, duplication transmission is proposed in a 5th generation (5G) new radio (NR) technology. In two devices that perform duplication transmission, a sending device may send two same data packets to a receiving device via two different transmission paths, to improve transmission reliability.

A sending device that performs duplication transmission usually needs to use an intermediate device to send two same data packets to a receiving device via two different paths. For example, in a dual-connectivity (DC) system, a master node makes two duplicates of a data packet to be sent to a terminal device, and sends the two duplicates to a secondary node. The secondary node sends the two duplicates of the same data packet to the terminal device via two different cells served by the secondary node. For another example, for a base station with a centralized unit/distributed unit (CU/DU) split architecture, a CU device makes two duplicates of a data packet to be sent to a terminal device, and sends the two duplicates to a DU device. The DU device sends the data packets to the terminal device via two different cells served by the base station.

It can be learned that performing or canceling duplication transmission requires coordination between the sending device, the receiving device, and the intermediate device. However, a method for canceling duplication transmission is still lacked in the prior art.

SUMMARY

Embodiments of this application provide a mode switching method, a data flow splitting method, and an apparatus, to provide a duplication transmission cancellation solution.

According to a first aspect, an embodiment of this application provides a mode switching method, including: A first device generates first indication information, where there are connections between a PDCP unit in the first device and at least two RLC units in a second device. The first device sends the first indication information to the second device, where the first indication information is used to indicate the second device to stop transmission between a first RLC unit in the at least two RLC units and the PDCP unit in the first device.

According to the foregoing method, the second device stops transmission between the first RLC unit and the PDCP unit based on the first indication information, to cancel duplication transmission of the second device.

In a possible implementation, the first device is a master node, the second device is a secondary node, and the first indication information is included in a secondary node modification request (s-node modification request) message. Alternatively, the first device is a secondary node, the second device is a master node, and the first indication information is included in a secondary node modification required (s-node modification required) message.

In a possible implementation, the first indication information includes a target data radio bearer DRB identifier; and a DRB connection corresponding to the target DRB identifier includes the connections between the PDCP unit and the at least two RLC units in the second device.

According to the foregoing method, the target DRB identifier is used to indicate, to the second device, a DRB connection for which duplication transmission needs to be canceled.

In a possible implementation, the first indication information includes first address information; and the first RLC unit is an RLC unit that is in the at least two RLC units and that transmits data between the first RLC unit and the PDCP unit by using a first address indicated by the first address information; or the first RLC unit is a preset RLC unit in the at least two RLC units.

In a possible implementation, after sending the first indication information to the second device, the first device may further receive first response information sent by the second device after the second device stops transmission between the first RLC unit in the at least two RLC units and the PDCP unit. The first device releases, based on the first response information, a port that is in a plurality of ports of the PDCP unit and that is used to transmit the data between the PDCP unit and the first RLC unit.

According to a second aspect, an embodiment of this application provides a mode switching method, including: A second device receives first indication information sent by a first device, where there are connections between a PDCP unit in the first device and at least two RLC units in the second device. The second device stops transmission between a first RLC unit in the at least two RLC units and the PDCP unit based on the first indication information.

In a possible implementation, the first device is a master node, the second device is a secondary node, and the first indication information is included in a secondary node modification request (s-node modification request) message. Alternatively, the first device is a secondary node, the second device is a master node, and the first indication information is included in a secondary node modification required (s-node modification required) message.

In a possible implementation, the first indication information includes a target data radio bearer DRB identifier; and a DRB connection corresponding to the target DRB identifier includes the connections between the PDCP unit and the at least two RLC units in the second device.

In a possible implementation, the first indication information includes first address information; and the first RLC unit is an RLC unit that is in the at least two RLC units and that transmits data between the first RLC unit and the PDCP unit by using a first address indicated by the first address information; or the first RLC unit is a preset RLC unit in the at least two RLC units.

In a possible implementation, that the second device stops transmission between a first RLC unit in the at least two RLC units and the PDCP unit based on the first indication information includes: The second device deletes transport network layer TNL information used to transmit the data between the first RLC unit and the PDCP unit. Alternatively, the second device deletes the first RLC unit.

In a possible implementation, after stopping transmission between the first RLC unit in the at least two RLC units and the PDCP unit based on the first indication information, the second device may further send first response information to the first device, where the first response information is used to indicate the first device to release a port that is in a plurality of ports of the PDCP unit and that is used to transmit the data between the PDCP unit and the first RLC unit.

According to a third aspect, an embodiment of this application provides a mode switching method, including: A first device generates second indication information, where there is a connection between a PDCP unit in the first device and an RLC unit in a second device. The first device sends the second indication information to the second device, where the second indication information is used to indicate the second device to switch a working mode RLC mode of the RLC unit; and the working modes include a mode of transmitting response information and a mode of not transmitting the response information.

According to the foregoing method, the second device may switch the working mode of the RLC unit based on the second indication information.

In a possible implementation, the first device is a master node, the second device is a secondary node, and the second indication information is included in a secondary node modification request (s-node modification request) message. Alternatively, the first device is a secondary node, the second device is a master node, and the second indication information is included in a secondary node modification required (s-node modification required) message.

In a possible implementation, the second indication information further includes switching manner information; and the switching manner information is used to indicate a switching manner in which the second device switches the working mode of the RLC unit.

According to a fourth aspect, an embodiment of this application provides a mode switching method, including: A second device receives second indication information sent by a first device, where there is a connection between a PDCP unit in the first device and an RLC unit in the second device. The second device switches a working mode RLC mode of the RLC unit based on the second indication information, where the second indication information is used to indicate the second device to switch the working mode RLC mode of the RLC unit; and the working modes include a mode of transmitting response information and a mode of not transmitting the response information.

In a possible implementation, the first device is a master node, the second device is a secondary node, and the second indication information is included in a secondary node modification request (s-node modification request) message. Alternatively, the first device is a secondary node, the second device is a master node, and the second indication information is included in a secondary node modification required (s-node modification required) message.

In a possible implementation, the second indication information further includes switching manner information; and the switching manner information is used to indicate a switching manner in which the second device switches the working mode of the RLC unit.

According to a fifth aspect, an embodiment of this application provides a data flow splitting method, including: A first device obtains an uplink address assigned by a core network to a second device. Then, the first device sends flow splitting request information to the second device, where the flow splitting request information is used to request the second device to start to receive a data flow split by the first device and to report the received data flow to the core network based on the uplink address.

In a possible implementation, the first device is a master node, the second device is a secondary node, and the flow splitting request information is included in a secondary node add request SN add request and/or a secondary node modification request SN modification request.

In a possible implementation, the first device may further send third indication information to the core network, where the third indication information is used to indicate the core network to receive the data flow sent by the second device.

According to a sixth aspect, an embodiment of this application provides a data flow splitting method, including: A second device receives flow splitting request information sent by a first device, where the flow splitting request information includes an uplink address assigned by a core network to the second device. The second device starts, based on the flow splitting request information, to receive a data flow split by the first device, and reports the received data flow to the core network based on the uplink address.

In a possible implementation, the first device is a master node, the second device is a secondary node, and the flow splitting request information is included in a secondary node add request SN add request and/or a secondary node modification request SN modification request.

According to a seventh aspect, an embodiment of this application provides an apparatus. The apparatus may be configured to perform the operations according to any one of the first aspect or the possible implementations of the first aspect, for example, the apparatus may include modules and units configured to perform the operations according to any one of the first aspect or the possible implementations of the first aspect; and/or the apparatus may be configured to perform the operations according to any one of the second aspect or the possible implementations of the second aspect, for example, the apparatus may include modules and units configured to perform the operations according to any one of the second aspect or the possible implementations of the second aspect; and/or the apparatus may be configured to perform the operations according to any one of the third aspect or the possible implementations of the third aspect, for example, the apparatus may include modules and units configured to perform the operations according to any one of the third aspect or the possible implementations of the third aspect; and/or the apparatus may be configured to perform the operations according to any one of the fourth aspect or the possible implementations of the fourth aspect, for example, the apparatus may include modules and units configured to perform the operations according to any one of the fourth aspect or the possible implementations of the fourth aspect; and/or the apparatus may be configured to perform the operations according to any one of the fifth aspect or the possible implementations of the fifth aspect, for example, the apparatus may include modules and units configured to perform the operations according to any one of the fifth aspect or the possible implementations of the fifth aspect; and/or the apparatus may be configured to perform the operations according to any one of the sixth aspect or the possible implementations of the sixth aspect, for example, the apparatus may include modules and units configured to perform the operations according to any one of the sixth aspect or the possible implementations of the sixth aspect.

According to an eighth aspect, an embodiment of this application provides an apparatus. The apparatus includes a processor and a transceiver. Optionally, the apparatus further includes a memory. The processor, the transceiver, and the memory communicate with each other through an internal connection path. The memory is configured to store an instruction. The processor is configured to execute the instruction stored in the memory. When the processor executes the instruction stored in the memory, the apparatus is enabled to perform the method according to any one of the first aspect or the possible implementations of the first aspect; and/or the apparatus is enabled to perform the method according to any one of the second aspect or the possible implementations of the second aspect; and/or the apparatus is enabled to perform the method according to any one of the third aspect or the possible implementations of the third aspect; and/or the apparatus is enabled to perform the method according to any one of the fourth aspect or the possible implementations of the fourth aspect; and/or the apparatus is enabled to perform the method according to any one of the fifth aspect or the possible implementations of the fifth aspect; and/or the apparatus is enabled to perform the method according to any one of the sixth aspect or the possible implementations of the sixth aspect.

According to a ninth aspect, an embodiment of this application provides a chip system, including a processor. Optionally, the chip system further includes a memory. The memory is configured to store a computer program. The processor is configured to: invoke the computer program from the memory and run the computer program, so that a communications device on which the chip system is installed performs the method according to any one of the first aspect or the possible implementations of the first aspect; and/or a communications device on which the chip system is installed performs the method according to any one of the second aspect or the possible implementations of the second aspect; and/or a communications device on which the chip system is installed performs the method according to any one of the third aspect or the possible implementations of the third aspect; and/or a communications device on which the chip system is installed performs the method according to any one of the fourth aspect or the possible implementations of the fourth aspect; and/or a communications device on which the chip system is installed performs the method according to any one of the fifth aspect or the possible implementations of the fifth aspect; and/or a communications device on which the chip system is installed performs the method according to any one of the sixth aspect or the possible implementations of the sixth aspect.

According to a tenth aspect, an embodiment of this application provides a computer program product. The computer program product includes computer program code. When the computer program code is run by a communications unit, a processing unit, a transceiver, or a processor of a communications device (for example, a user plane network element or a session management network element), the communications device is enabled to perform the method according to any one of the first aspect or the possible implementations of the first aspect; and/or the communications device is enabled to perform the method according to any one of the second aspect or the possible implementations of the second aspect; and/or the communications device is enabled to perform the method according to any one of the third aspect or the possible implementations of the third aspect; and/or the communications device is enabled to perform the method according to any one of the fourth aspect or the possible implementations of the fourth aspect; and/or the communications device is enabled to perform the method according to any one of the fifth aspect or the possible implementations of the fifth aspect; and/or the communications device is enabled to perform the method according to any one of the sixth aspect or the possible implementations of the sixth aspect.

According to an eleventh aspect, an embodiment of this application provides a computer readable storage medium. The computer readable storage medium stores a program. The program enables a communications device (for example, a terminal device or a network device) to perform the method according to any one of the first aspect or the possible implementations of the first aspect; and/or enables a communications device to perform the method according to any one of the second aspect or the possible implementations of the second aspect, and/or enables a communications device to perform the method according to any one of the third aspect or the possible implementations of the third aspect; and/or enables a communications device to perform the method according to any one of the fourth aspect or the possible implementations of the fourth aspect; and/or enables a communications device to perform the method according to any one of the fifth aspect or the possible implementations of the fifth aspect; and/or enables a communications device to perform the method according to any one of the sixth aspect or the possible implementations of the sixth aspect.

According to a twelfth aspect, an embodiment of this application provides a computer program. When the computer program is executed on a computer, the computer is enabled to implement the method according to any one of the first aspect or the possible implementations of the first aspect; and/or the computer is enabled to implement the method according to any one of the second aspect or the possible implementations of the second aspect; and/or the computer is enabled to implement the method according to any one of the third aspect or the possible implementations of the third aspect; and/or the computer is enabled to implement the method according to any one of the fourth aspect or the possible implementations of the fourth aspect; and/or the computer is enabled to implement the method according to any one of the fifth aspect or the possible implementations of the fifth aspect; and/or the computer is enabled to implement the method according to any one of the sixth aspect or the possible implementations of the sixth aspect.

According to a thirteenth aspect, an embodiment of this application provides a system. The system includes a network device.

The network device may be configured to perform the method according to any one of the first aspect or the possible designs of the first aspect; and/or may be configured to perform the method according to any one of the second aspect or the possible designs of the second aspect; and/or may be configured to perform the method according to any one of the third aspect or the possible designs of the third aspect; and/or may be configured to perform the method according to any one of the fourth aspect or the possible designs of the fourth aspect; and/or may be configured to perform the method according to any one of the fifth aspect or the possible designs of the fifth aspect, and/or may be configured to perform the method according to any one of the sixth aspect or the possible designs of the sixth aspect.

BRIEF DESCRIPTION OF DRAWINGS

The following briefly describes accompanying drawings that need to be used in embodiments of the present invention.

DESCRIPTION OF EMBODIMENTS

The following describes the embodiments of the present invention with reference to accompanying drawings in the embodiments of the present invention.

Technical solutions in the embodiments of this application may be applied to various communications systems, for example, a long term evolution (LTE) system, a worldwide interoperability for microwave access (WiMAX) communications system, a future 5th generation (5G) system such as a new generation radio access technology (NR), and a future communications system such as a 60 system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the term "for example" in the embodiments of this application is used to represent giving an example, an illustration, or a description. Any embodiment or design scheme described as an "example" in this application should not be explained as being more preferred or having more advantages than another embodiment or design scheme. Exactly, "example" is used to present a concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

The embodiments of this application may be applied to a time division duplex (TDD) scenario, or may be applied to a frequency division duplex (FDD) scenario.

In the embodiments of this application, an NR network scenario in a wireless communications network is used to describe some scenarios. It should be noted that the solutions in the embodiments of this application may be further applied to another wireless communications network, and a corresponding name may also be replaced with a name of a corresponding function in the another wireless communications network.

Figure 1:
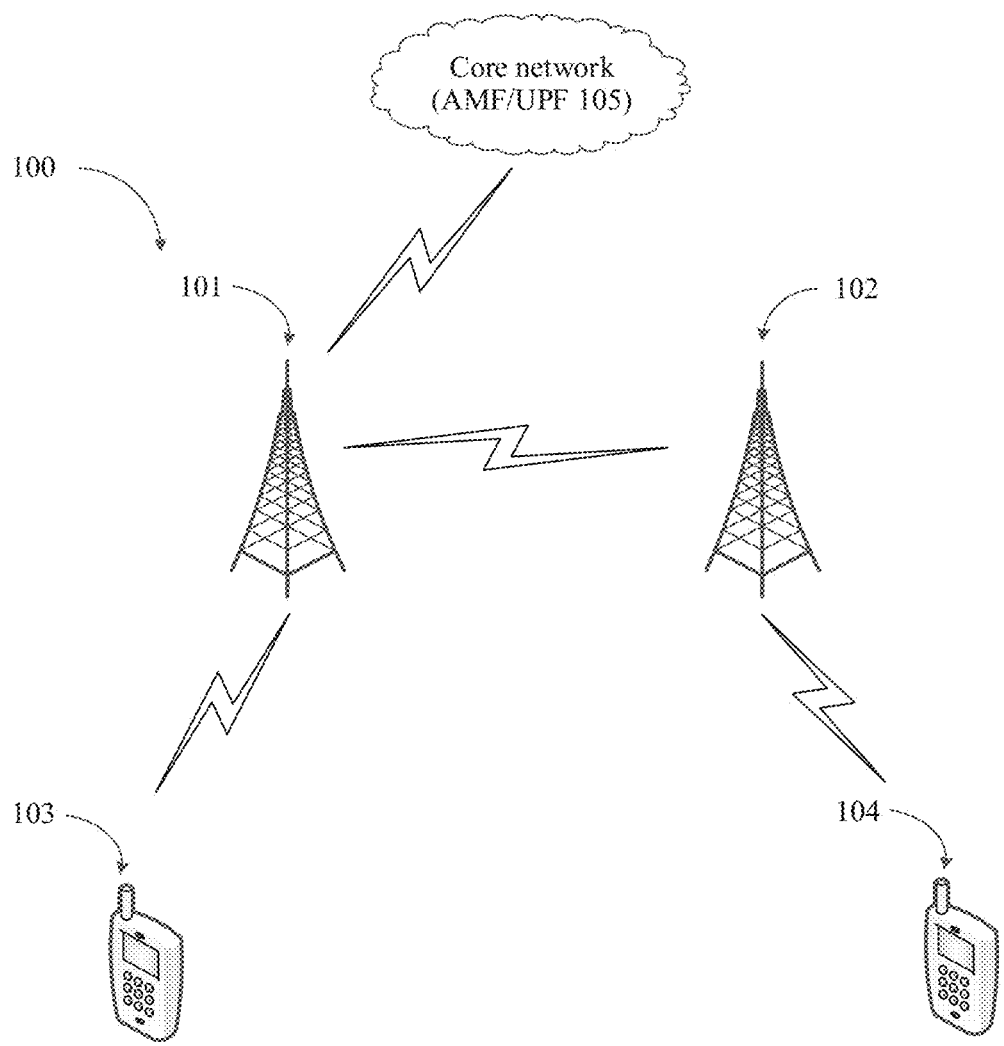
FIG. 1 is a schematic architectural diagram of a communications system.

For ease of understanding the embodiments of this application, a communications system shown in FIG. 1 is first used as an example to describe in detail a communications system to which the embodiments of this application are applicable. As shown in FIG. 1, the communications system 100 includes a plurality of network devices (101 and 102) and terminal devices (103 and 104). A plurality of antennas may be configured for the network devices 101 and 102, and a plurality of antennas may also be configured for the terminal devices 103 and 104.

The network devices 101 and 102 each are a device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (WIFI) system, a wireless relay node, a wireless backhaul node, a transmission point (transmission and reception point (TRP) or transmission point (TP)), or the like. The device may alternatively be a gNB or a transmission point (TRP or TP) in a 5G system, for example, an NR system, or one or one group (including a plurality of antenna panels) of antenna panels of a base station in a 5G system. The device may alternatively be a network node, for example, a baseband unit (BBU) or a distributed unit (DU), that constitutes a gNB or a transmission point.

In some deployments, the gNB may include a centralized unit (CU) and a distributed unit (DU). The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal devices 103 and 104 each may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, a terminal device having a wireless transceiver function and a chip that may be disposed in the foregoing terminal device are collectively referred to as a terminal device.

In the system shown in FIG. 1, a system including the network device 101, the network device 102, and the terminal device 104 is a dual-connectivity system. The network device 101 is connected to a core network, and is a master node (m-node), and the network device 102 is a secondary node (s-node). Based on this, for sending downlink data to the terminal device 104, the core network first needs to send the downlink data to the network device 101, the network device 101 forwards the downlink data to the network device 102, and then the network device 102 sends the downlink data to the terminal device 104. A process in which the terminal device 104 sends uplink data to the core network is similar to the foregoing process. Details are not described again.

When duplication transmission is performed between the network device 101 and the terminal device 104, an example in which the network device 101 sends downlink data (or may be a downlink message, where the downlink data is used as an example for description in this embodiment of this application) to the terminal device 104 is used. The network device 101 duplicates the downlink data into two pieces of same downlink data, and sends the two pieces of same downlink data to the network device 102. The network device 102 sends the two pieces of same downlink data to the terminal device 104 via two different cells, to improve downlink data transmission reliability. In the foregoing process, the network device 102 is an intermediate device between the network device 101 and the terminal device 104. A process in which the terminal device 104 sends uplink data to the network device 101 is similar to the foregoing process. Details are not described again.

Figure 2:
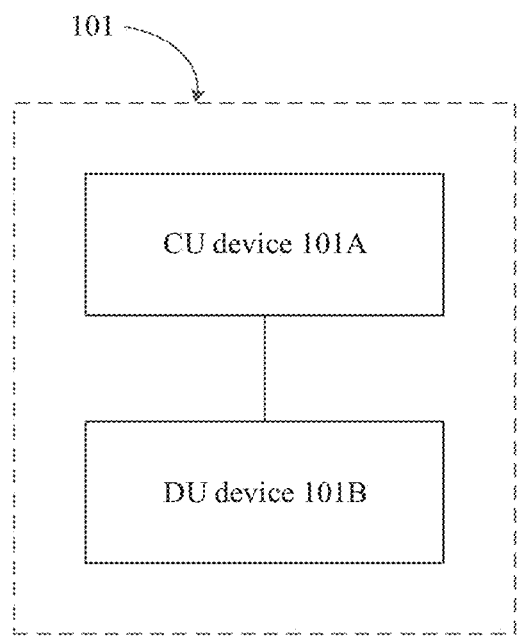
FIG. 2 is a schematic diagram of a CU/DU split architecture.

In addition, when duplication transmission is performed in a non-dual-connectivity system, an intermediate device may also exist. As shown in FIG. 1, a system including the network device 101 and the terminal device 103 is the non-dual-connectivity system. The network device 101 may use a CU/DU split architecture shown in FIG. 2. As shown in FIG. 2, the network device 101 may include a CU device 101A and a DU device 101B. When sending downlink data to the terminal device 103, the CU device 101A makes two duplicates of the downlink data, and sends the two duplicates of the same downlink data to the DU device 101B. The DU device 101B may send the two duplicates of the same data to the terminal device 103 by using two different cells served by the DU device 101B. In the foregoing process, the DU device 101B is an intermediate device between the CU device 101A and the terminal device 103. Based on a similar process, the DU device 101B may also receive two duplicates of same uplink data from the terminal device 103, and send the two duplicates of same uplink data to the CU device 101A.

When an intermediate device is required to establish two transmission links between a sending device and a receiving device that perform duplication transmission, a data radio bearer (DRB) connection is usually required between the intermediate device and the sending device to transmit two duplicates of same data. One DRB connection is established mainly based on connections between one PDCP unit and several RLC units. A PDCP unit and an RLC unit in one DRB connection may belong to a same device, or may belong to different devices. In this embodiment of this application, the PDCP unit is a unit in the sending device, and the RLC unit is a unit in the receiving device. During duplication transmission, one PDCP unit and two RLC units in the DRB connection are connected. The PDCP unit in the sending device may make two duplicates of to-be-sent data, and respectively send the two duplicates to the two RLC units in the intermediate device.

Figure 3:
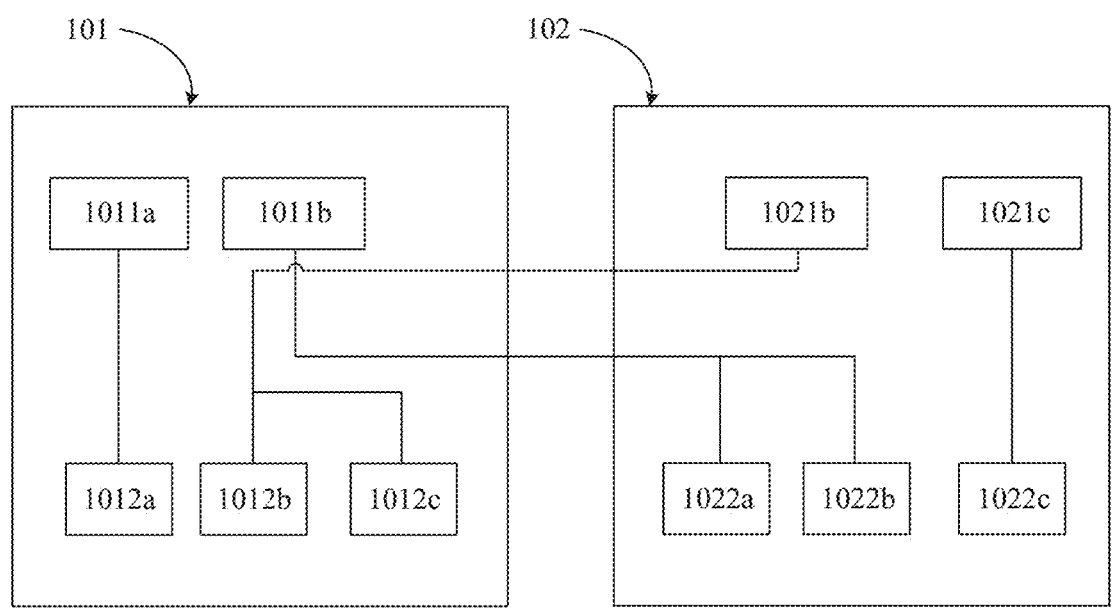
FIG. 3 is a schematic diagram of a DRB connection relationship.

Duplication transmission in a DC system is used as an example. FIG. 3 shows an example of a schematic diagram of a DRB connection between the network device 101 and the network device 102 in FIG. 1. As shown in FIG. 3, the network device 101 includes a plurality of PDCP units 1011 (1011a and 1011b) and a plurality of RLC units 1012 (1012a. 1012b, and 1012c). Similarly, the network device 102 includes a plurality of PDCP units 1021 (1021b and 1021c) and a plurality of RLC units 1022 (1022a, 1022b, and 1022c).

As shown in FIG. 3, the network device 101 and the network device 102 include a plurality of DRB connections. PDCP units and RLC units in some DRB connections, for example, a DRB connection between the PDCP unit 1011a and the RLC unit 1012a in the network device 101, belong to a same network device. PDCP units and RLC units in other DRB connections, for example, a DRB connection that connects the PDCP unit 1011b in the network device 101 to the RLC units 1022a and 1022b in the network device 102, belong to different network devices.

For example, during duplication transmission of downlink data, the network device 101 may send downlink data to the network device 102 through the DRB connection of the PDCP unit 1011b. A duplication function is configured for the PDCP unit 1011b. The PDCP unit 1011b may make two duplicates of to-be-sent downlink data, and then respectively send the two duplicates of the same downlink data to the RLC units 1022a and 1022b.

When duplication transmission is canceled, the network device 101 releases the duplication function of the PDCP unit 1011b. However, a method for canceling duplication transmission of the network device 102 is still lacked in an existing communications solution. Similarly, for the network device with the CU/DU split architecture shown in FIG. 2, a method for canceling duplication transmission of the DU device 101B is also lacked in the existing communications solution.

Based on this, an embodiment of this application provides a mode switching method, to cancel duplication transmission of an intermediate device. The method is applicable to the network device 102 shown in FIG. 1, and is also applicable to the DU device 101B shown in FIG.

Figure 4:
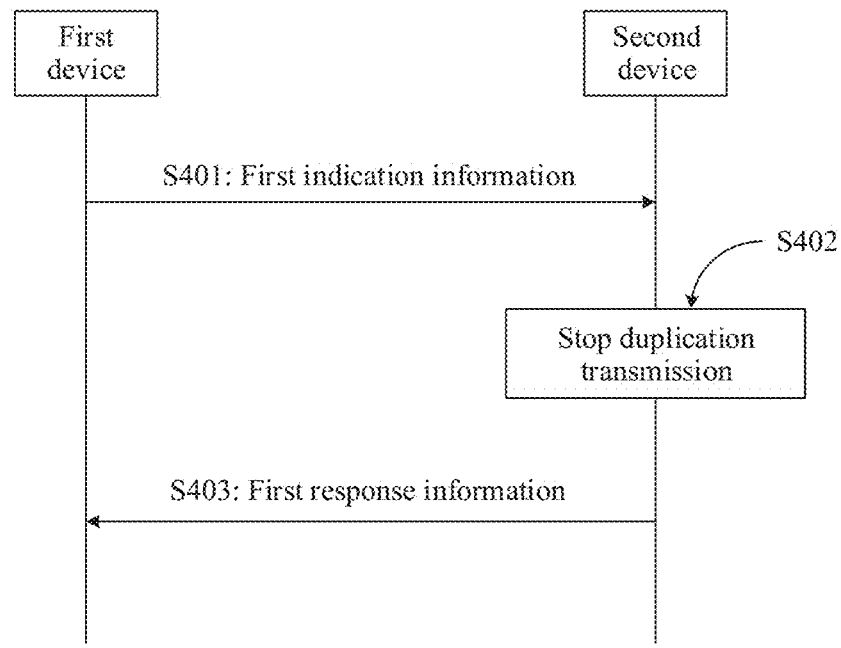
FIG. 4 is a schematic flowchart of a mode switching method according to an embodiment of this application.

FIG. 4 shows an example of a schematic flowchart of a mode switching method according to an embodiment of this application. As shown in FIG. 4, the method mainly includes the following steps.

S401: A first device sends first indication information to a second device.

There are connections between a PDCP unit in the first device and at least two RLC units in the second device. In this embodiment of this application, the connection between the PDCP unit and the RLC unit may be a transmission path or a transmission tunnel for data or a message between the PDCP unit and the RLC unit.

During duplication transmission, the PDCP unit may make at least two duplicates of data to be sent to the second device, and respectively send the at least two duplicates to the at least two RLC units in the second device. When the first device stops duplication transmission, the first device releases a duplication function of the PDCP unit, and therefore the PDCP unit no longer duplicates data to be sent to the second device. In a possible implementation, in this embodiment of this application, "stop" has a same meaning as "cancel", "de-configure", and "release".

Referring to FIG. 1, in a possible implementation, the first device is the network device 101, the second device is the network device 102, and the connections between the PDCP unit and the at least two RLC units are used to transmit downlink data. The first device, namely, the network device 101, is a master node, and the second device, namely, the network device 102, is a secondary node. In this embodiment of this application, the first device acting as the master node may send, by using a secondary node modification request (s-node modification request) message, the first indication information to the second device acting as the secondary node.

In another possible implementation, the first device is the network device 102, the second device is the network device 101, and the connections between the PDCP unit and the at least two RLC units are used to transmit uplink data. The first device, namely, the network device 102, is a secondary node, and the second device, namely, the network device 101, is a master node. In this embodiment of this application, the first device acting as the secondary node may send, by using a secondary node modification required (s-node modification required) message, the first indication information to the second device acting as the master node.

In the CU/DU split architecture shown in FIG. 2, the first device may be the CU device 101A, and the second device may be the DU device 101B. The CU device 101A may send the first indication information to the DU device 101B through an F1 interface. When a control plane and a user plane of the CU device 101A are split, the CU device OA may send the first indication information to the DU device 101B through a control plane F1 interface, or may send the first indication information to the DU device 101B through a user plane F interface.

S402: The second device cancels duplication transmission.

In this embodiment of this application, the second device stops transmission between the PDCP unit in the first device and a first RLC unit in the at least two RLC units connected to the PDCP unit, to cancel duplication transmission.

In this embodiment of this application, the connections between the PDCP unit in the first device and the at least two RLC units are included in a DRB connection. The first device and the second device usually include a plurality of DRB connections. In a possible implementation, the first indication information includes a target DRB identifier. After the first device and the second device establish a DRB connection, the second device caches an identifier of the established DRB connection. Based on this, after receiving the first indication information, the second device may determine, based on the target DRB identifier in the first device, a DRB connection corresponding to the target DRB identifier from the plurality of DRB connections to the first device, to stop transmission between the PDCP unit in the first device and the first RLC unit in the at least two RLC units associated with the DRB connection.

In a possible implementation, the first RLC unit may be any one of the at least two RLC units. For example, in FIG. 3, the network device 102 is the second device. After receiving the first indication information sent by the network device 101, the network device 102 stops transmission between either of the RLC unit 1022a and the RLC unit 1022b and the PDCP unit 1011b.

In another possible implementation, the first indication information includes first address information. The first RLC unit may be an RLC unit that is in the at least two RLC units and that transmits data between the first RLC unit and the PDCP unit by using a first address indicated by the first address information.

FIG. 3 is used as an example. The RLC unit 1022a in the network device 102 performs transmission with the PDCP unit 1011b by using an address a, and the RLC unit 1022b performs transmission with the PDCP unit 1011b by using an address b. In this embodiment of this application, the network device 101 may determine an address, for example, the address a, from the address a or the address b, and add the first address information corresponding to the address a to the first indication information. After receiving the first indication information, the network device 102 determines, based on the first address information in the first indication information, that an address corresponding to the first address information is the address a. Further, the network device 102 may determine that the first RLC unit is the RLC unit 1022a, so that the network device 102 stops transmission between the RLC unit 1022a and the PDCP unit 1011b.

In another possible implementation, the first RLC unit may alternatively be a preset RLC unit in the at least two RLC units. For example, when establishing a DRB connection to the second device to perform duplication transmission, the first device presets an RLC unit in the second device. For example, the first device sends two addresses to the second device, and specifies one of the two addresses as a primary address and the other as a secondary address. The second device constructs two RLC units. One of the two RLC units sends data to the PDCP unit by using the primary address, and the other sends data to the PDCP unit by using the secondary address. The RLC unit that sends the data to the PDCP unit by using the secondary address may be used as the preset RLC unit. When canceling duplication transmission, the second device stops transmission between the preset RLC unit and the PDCP unit.

FIG. 3 is used as an example. There are connections between the PDCP unit 101*l* b in the network device 101 and the RLC units 1022a and 1022b in the network device 102, to perform duplication transmission between the network device 101 and the network device 102. The RLC unit 1022a is the preset RLC unit. After receiving the first indication information, the second device stops transmission between the RLC unit 1022a and the PDCP unit 1011b according to a preset rule.

In another possible implementation, the first indication information further includes a second address assigned by the first device to the RLC unit in the second device. When the quantity of addresses is less than the quantity of RLC units, the second device stops transmission between the first RLC unit and the PDCP unit. Still further, the first RLC unit is an RLC unit that sends data to the PDCP unit without using the second address in the first indication information.

For example, the first indication information includes an address a. In the second device, an RLC unit A sends data to the PDCP unit in the first device by using the address a, and an RLC unit B sends data to the PDCP unit in the first device by using an address b. In this case, after receiving the first indication information, the second device stops transmission between the RLC unit B and the PDCP unit, but retains transmission between the RLC unit A and the PDCP unit.

In this embodiment of this application, the second device may stop transmission between the first RLC unit and the PDCP unit in a plurality of manners. For example, in a possible implementation, the second device deletes transport network layer (TNL) information used to transmit data between the first RLC unit and the PDCP unit, for example, a transport layer address and a GPRS tunneling protocol-tunnel endpoint identifier (GTP-TEID) that are in the second device and that are used to transmit the data between the first RLC unit and the PDCP unit. In another possible implementation, the second device may further delete the first RLC unit, to release a resource occupied by the first RLC unit.

As shown in FIG. 4, after stopping transmission between the first RLC unit and the PDCP unit, the second device may further continue to perform S403 to send first response information to the first device.

After receiving the first response information, the first device may determine that the second device cancels duplication transmission. In a possible implementation, after receiving the first response information, the first device may further release a port that is in a plurality of ports of the PDCP unit in the first device and that is used to transmit data between the PDCP unit and the first RLC unit, or a port that is in the transport network layer TNL information and that is used to transmit data between the PDCP unit and the first RLC unit.

Referring to FIG. 3, the PDCP unit 1011b in the network device 101 includes at least two ports that are respectively configured to transmit data to the RLC units 1022a and 1022b in the second device 102. For example, a port a is configured to transmit data between the PDCP unit 1011b and the RLC unit 1022a, and a port b is configured to transmit data between the PDCP unit 1011b and the RLC unit 1022b. If the network device 102 stops transmission between the RLC unit 1022a and the PDCP unit 1011b, the network device 102 may release the port a.

In a possible implementation, the first response information may further carry RLC indication information corresponding to the RLC unit 1022a. In this case, the network device 101 may determine, based on the first response information, that the second network device stops transmission between the RLC unit 1022a and the PDCP unit 1011b, to release the port a.

In a possible implementation, the first indication information sent by the first device to the second device includes first address information. In this case, the first device may determine a port that is in a plurality of ports of the PDCP unit and that is connected to an address indicated by the first address information, and release the port.

In another possible implementation, the first device releases a preset port in a plurality of ports of the PDCP unit. The preset port corresponds to the preset RLC unit in the second device.

In another possible implementation, the first indication information sent by the first device to the second device includes a second address, and the second address is an address used by the RLC unit that is still retained by the second device after the second device cancels duplication transmission. Based on this, the first device may release a port other than a port associated with the second address in the plurality of ports of the PDCP unit.

In a DRB connection, the PDCP unit and the RLC unit have at least the following two radio link control modes (RLC mode): an acknowledged mode (AM) and an unacknowledged mode (UM). In the AM mode, an RLC unit on a receive side needs to send response information to an RLC unit on a transmit side. In the UM mode, the RLC unit on the receive side does not need to send response information to the RLC unit on the transmit side. Because there is a correspondence between receiving and sending actions of the PDCP unit and the RLC unit, when a working mode of the DRB connection is switched, mode switching needs to be synchronously performed on the PDCP unit and the RLC unit in the same DRB connection.

Figure 5:
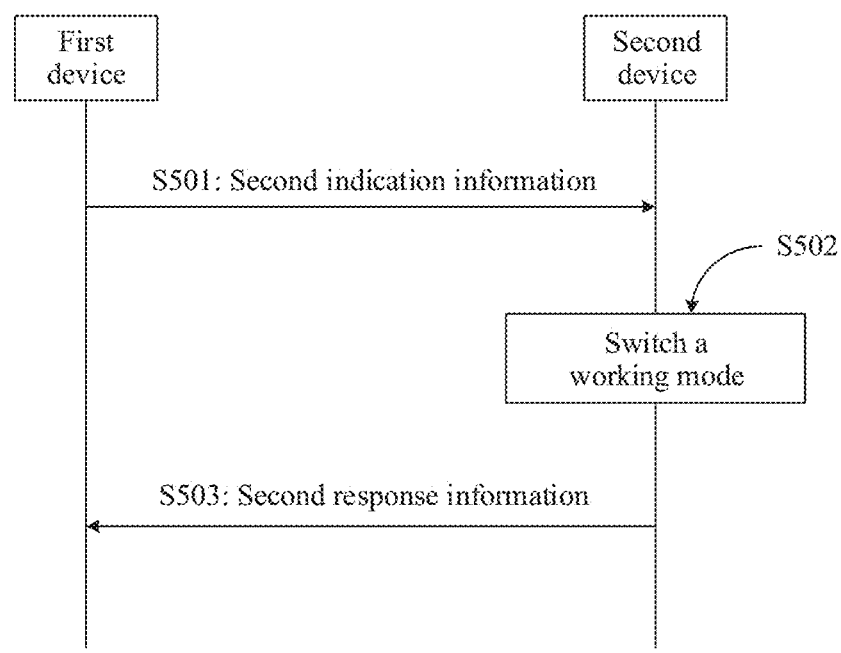
FIG. 5 is a schematic flowchart of a mode switching method according to an embodiment of this application.

Based on this, an embodiment of this application further provides a mode switching method, so that a working mode of an RLC unit can be synchronously switched when a working mode of a PDCP unit is switched. FIG. 5 is a schematic flowchart of a mode switching method according to an embodiment of this application. As shown in FIG. 5, the method mainly includes the following steps.

S501: A first device sends second indication information to a second device.

There is a connection between a PDCP unit in the first device and an RLC unit in the second device. In this embodiment of this application, there are connections between a PDCP unit in the first device and one or more RLC units in the second device, and the connection between the PDCP unit and the RLC unit is included in a DRB connection.

Referring to FIG. 1, in a possible implementation, the first device is the network device 101, the second device is the network device 102, and the connection between the PDCP unit and the RLC unit is used to transmit downlink data. The first device, namely, the network device 101, is a master node, and the second device, namely, the network device 102, is a secondary node. In this embodiment of this application, the first device acting as the master node may send, by using a secondary node modification request (s-node modification request) message, the second indication information to the second device acting as the secondary node. Still further, the second indication information may be carried in PDU session resources to be modified in the s-node modification request message.

In another possible implementation, the first device is the network device 102, the second device is the network device 101, and the connection between the PDCP unit and the RLC unit is used to transmit uplink data. The first device, namely, the network device 102, is a secondary node, and the second device, namely, the network device 101, is a master node. In this embodiment of this application, the first device acting as the secondary node may send, by using a secondary node modification required (s-node modification required) message, the second indication information to the second device acting as the master node. Still further, the second indication information may alternatively be carried in PDU session resources to be modified in the s-node modification required message.

In the CU/DU split architecture shown in FIG. 2, the first device may be the CU device 101A, and the second device may be the DU device 101B. The CU device 101A may send the second indication information to the DU device 101B through an F1 interface. When a control plane and a user plane of the CU device 101A are separated, the CU device 101A may send the second indication information to the DU device 101B through a control plane F1 interface, or may send the second indication information to the DU device 101B through a user plane F1 interface.

S502: The second device switches a working mode of the RLC unit based on the second indication information.

In this embodiment of this application, the working modes of the RLC unit include a mode of transmitting response information and a mode of not transmitting the response information, for example, a working mode of the RLC unit in the AM mode and the UM mode.

In this embodiment of this application, the second device may switch the working mode of the RLC unit in at least the following two manners:

In a possible implementation, the second device releases the DRB connection of the RLC unit, and re-establishes a DRB connection to the first device. Based on this, in a possible implementation, the second indication information may further include a target DRB identifier corresponding to the DRB connection, to indicate the second device to switch the working mode of the RLC unit in the DRB connection corresponding to the DRB identifier.

In another possible implementation, the second device implements mode switching of the RLC unit through full configuration (full config). The DRB connection usually corresponds to a terminal device that accesses the second device. As shown in FIG. 1, it is assumed that the network device 101 is the first device, the network device 102 is the second device, and at least one DRB connection between the network device 101 and the network device 102 corresponds to the terminal device 104, and is a DRB connection that is established by the second device and the first device and configured for the terminal device 104 after the terminal device 104 accesses the second device. Therefore, a configuration parameter configured by the network device 102 for the terminal device 104 includes a related parameter of the DRB connection configured for the terminal device 104. In this embodiment of this application, full config means that the network device 102 invalidates existing configuration data of the terminal device 104, and reconfigures the terminal device 104.

In this embodiment of this application, switching manners, for example, the foregoing two possible switching manners, may be preset in the second device. In a possible implementation, the second indication information further includes switching manner information. The second device may determine, based on the switching manner information, a preset switching manner indicated by the switching manner information, and switch the working mode of the RLC unit based on the determined switching manner.

As shown in FIG. 5, after switching the working mode of the RLC unit, the second device may further continue to perform S503 to feed back second response information to the first device. The first device may determine, based on the second response information, that the RLC unit in the second device has switched the working mode.

In a possible implementation, if the first device is the network device 101, and the second device is the network device 102, the network device 102 may send the second response information to the network device 101 by using a secondary node modification request acknowledge (s-node modification request acknowledge) message.

In another possible implementation, if the first device is the network device 102, and the second device is the network device 101, the network device 101 may send the second response information to the network device 102 by using a secondary node modification required (s-node modification required) message.

In a DC system, in a case such as excessively heavy load or communication environment quality deterioration, a master node switches some quality of service (QoS) data flows of a protocol data unit (PDU) session from the master node to a secondary node in the DC system, that is, performs a split PDU session. In the system shown in FIG. 1, the network device 101 is a master node, and the network device 102 is a target node. To be specific, the network device 101 determines a secondary node that is determined from a plurality of secondary nodes (which are not shown in the figure) and that is configured to perform a split PDU session. When determining that the network device 102 performs a split PDU session, the network device 101 separately sends an instruction to the terminal device 103 and the network device 102, to indicate the terminal device 103 and the network device 102 to transmit a data flow obtained through flow splitting performed by the network device 101. The network device 102 and the terminal device 103 establish a transmission link according to the indication of the network device 101.

However, in an uplink, after the network device 102 obtains an uplink address of a core network, for example, an uplink address of a core network control plane network element/core network user plane network element (access and mobility management function (AMF) AMF network element/user plane function (UPF) UPF network element 105) in 5GNR shown in FIG. 1, the network device 102 sends, to the AMF network element/UPF network element 105, the data flow received from the terminal device 103.

Figure 6:
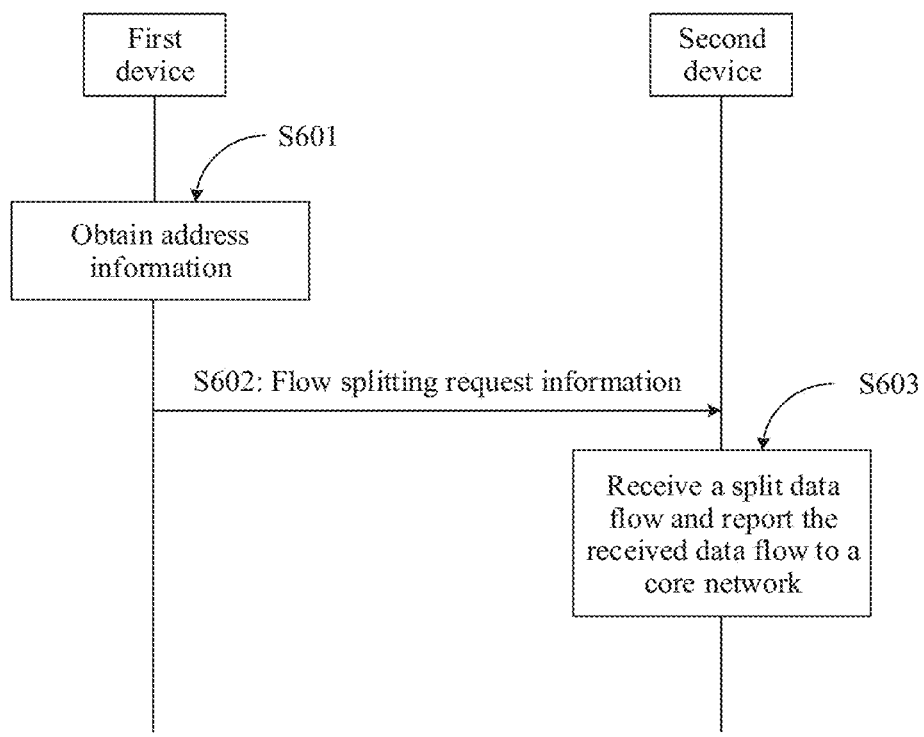
FIG. 6 is a schematic flowchart of a data flow splitting method according to an embodiment of this application.

Based on this, an embodiment of this application provides a data flow splitting method. FIG. 6 shows an example of a schematic flowchart of a data flow splitting method according to an embodiment of this application. As shown in FIG. 6, the data flow splitting method provided in this embodiment of this application mainly includes the following steps.

S601: A first device obtains an uplink address assigned by a core network to a second device.

The first device is a device that is willing to perform data flow splitting, and the second device is a device configured to receive a split data flow. In a DC system, the first device may be a master node, for example, the network device 101 in FIG. 1, and the second device may be a secondary node, for example, the network device 102 in FIG. 1.

After determining that data flow splitting is to be performed, the first device may first determine the second device configured to receive the split data flow. Then, the first device requests the core network to assign the uplink address to the second device. It should be understood that the uplink address is an uplink address of the core network, and is used by the core network to receive uplink data sent by the second device.

In 5G, the first device may send a request message to the AMF network element in the AMF network element/UPF network element 105. After receiving the request message, the AMF network element requests the UPF network element to assign an uplink address to the second device, and the AMF network element returns, to the first device, the uplink address assigned to the second device.

In a possible implementation, the first device may further send identification information of the second device and identification information of a PDU session on which flow splitting is to be performed to the core network. The core network may assign an uplink address to the second device based on the identification information of the second device, and determine, based on the identification information of the PDU session, the PDU session on which the first device performs flow splitting.

In a possible implementation, the first device may further send third indication information to the core network, to indicate the core network to receive the data flow sent by the second device.

S602: The first device sends flow splitting request information to the second device.

In this embodiment of this application, the flow splitting request information includes the uplink address assigned by the core network to the second device. In a possible implementation, the first device is a master node, and the second device is a secondary node. The first device may send the flow splitting request information to the second device by using a secondary node add request (SN add request) and/or a secondary node modification request (SN modification request).

S603: The second device starts, based on the flow splitting request information, to receive a data flow split by the first device, and reports the received data flow to the core network based on the uplink address.

In this embodiment of this application, the flow splitting request information has a function of triggering the second device to receive a split data flow sent by a terminal device. After receiving the flow splitting request information, the second device starts to receive the data flow split by the first device. In a possible implementation, the flow splitting request information may further include identification information of the terminal device, so that the second device identifies whether the received data flow is the data flow split by the first device.

Figure 7:
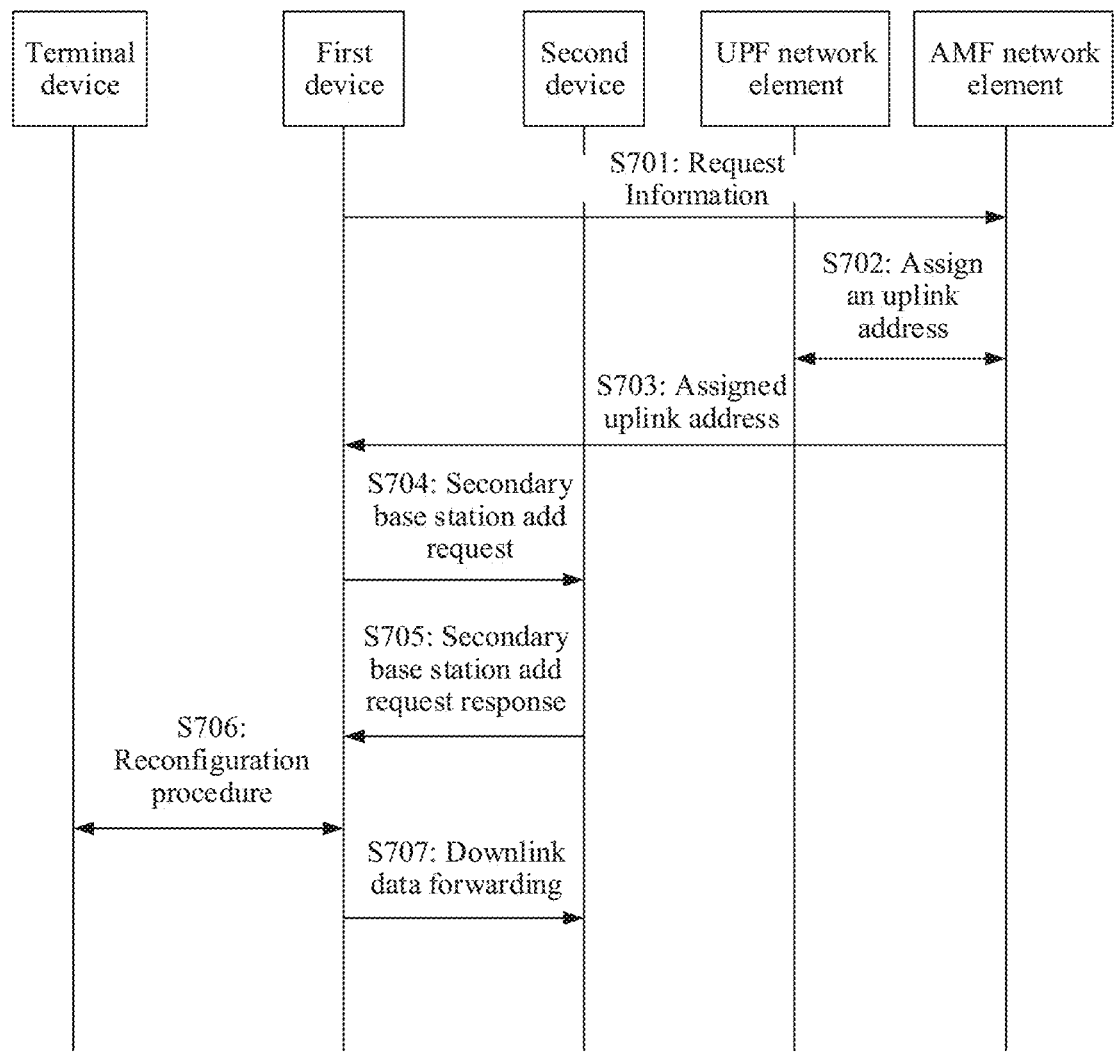
FIG. 7 is a specific schematic flowchart of a data flow splitting method according to an embodiment of this application.

FIG. 7 shows an example of a specific procedure of a data flow splitting method according to an embodiment of this application. As shown in FIG. 7, the method mainly includes the following steps.

S701: A first device sends request information to an AMF network element.

S702: The AMF network element requests, based on the request information, a UPF network element to assign an uplink address to a second device.

S703: The AMF network element sends, to the first device, the uplink address assigned to the second device.

S704: The first device sends a secondary node add request to the second device, where the request carries the uplink address assigned by the UPF network element to the second device.

S705: The second device returns a secondary node add request response to the first device.

S706: The first device and a terminal device perform a reconfiguration procedure, to assign data flows of the terminal device to the first device and the second device.

A sequence between S706 and another step is not limited in this embodiment of this application. For example, S706 may alternatively be performed before or after any one of S701 to S705, or may be performed in parallel.

S707: The first device and the second device perform a data forwarding (dl data forwarding) process. To be specific, the first device forwards, to the second device, a split data flow received from the UPF network element.

According to the data flow splitting methods shown in FIG. 6 and FIG. 7, the second device can obtain, before receiving the data flow split by the first device, the uplink address assigned by the network device to the second device, so that after receiving the data flow split by the first device, the second device can directly send the received data flow to the core network based on the uplink address. In addition, in the solution provided in this embodiment of this application, an uplink address assigned by the core network to the first device does not need to be multiplexed. This complies with a protocol specification. The first device does not need to forward the data flow, so that occupation of processing resources of the first device can be reduced.

Figure 8:
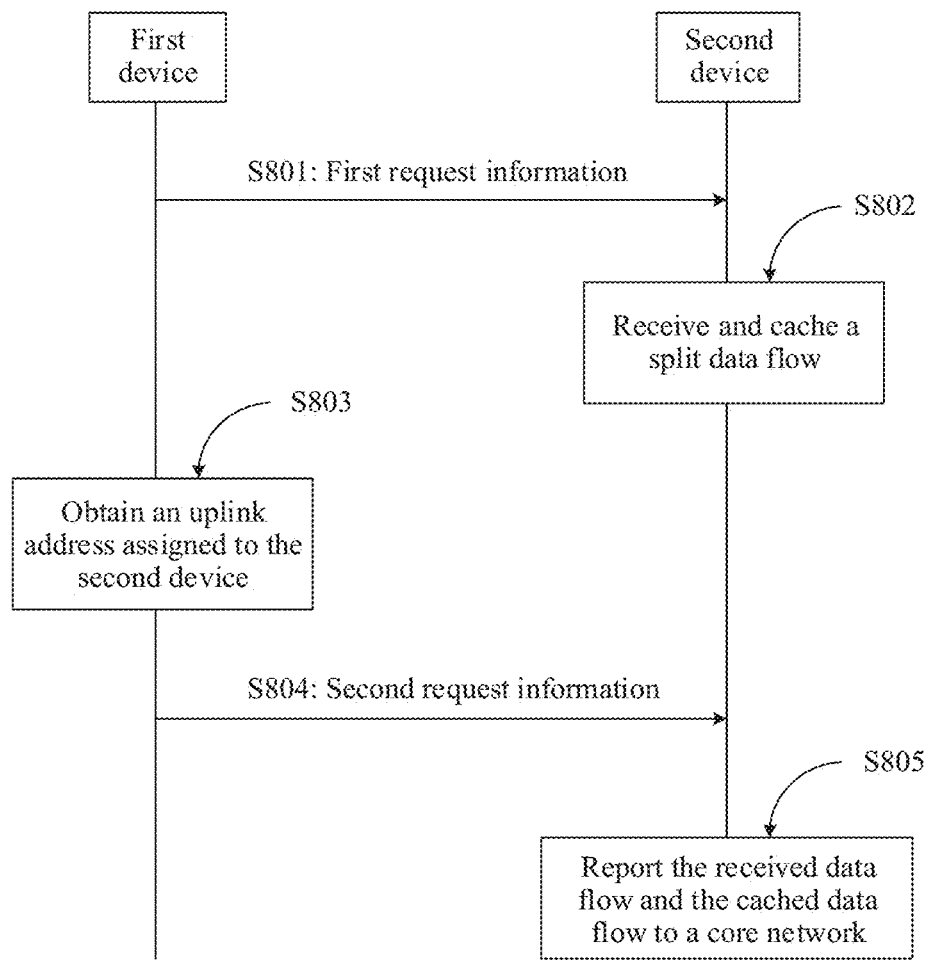
FIG. 8 is a schematic flowchart of a data flow splitting method according to an embodiment of this application.

In a possible implementation, an embodiment of this application further provides a schematic flowchart of another data flow splitting method. As shown in FIG. 8, the method mainly includes the following steps.

S801: A first device sends first request information to a second device.

The first device may send the first request information to the second device by using a secondary node add request (SN add request) and/or a secondary node modification request (SN modification request).

S802: The second device receives, based on the first request information, a data flow split by the first device.

In a possible implementation, when receiving the data flow split by the first device from a terminal device, the second device buffers and caches the received data flow.

S803: The first device obtains an uplink address assigned by a core network to the second device.

S804: The first device sends second request information to the second device.

The second request information includes the uplink address assigned by the core network to the second device. In a possible implementation, the first device may send the second request information to the second device by using an SN reconfiguration complete message.

S805: The second device reports the received data flow to the core network based on the uplink address in the second request information.

In a possible implementation, the second device may further report the cached data flow to the core network based on the second request information.

Figure 9:
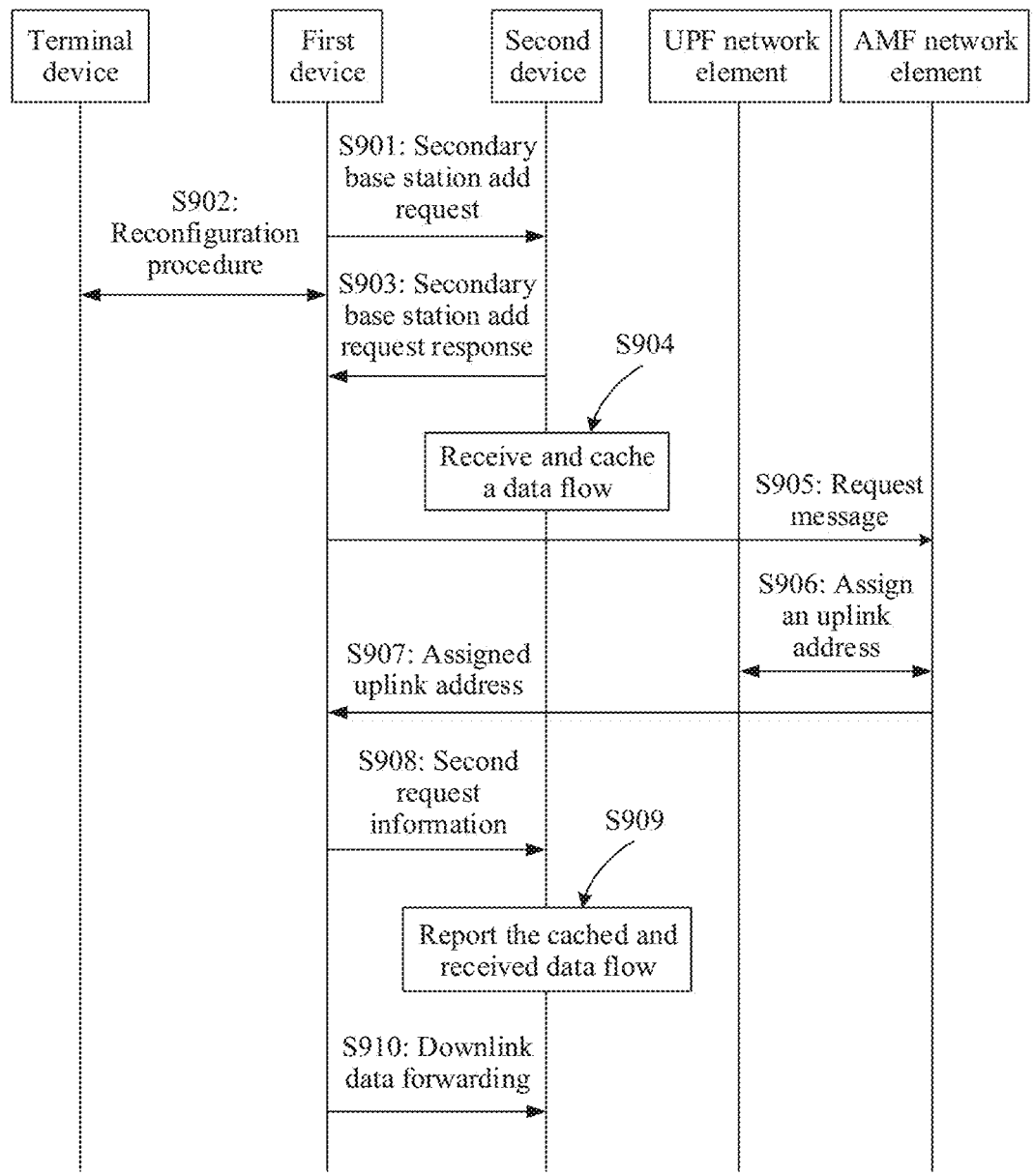
FIG. 9 is a specific schematic flowchart of a data flow splitting method according to an embodiment of this application.

FIG. 9 shows an example of a specific procedure of a data flow splitting method according to an embodiment of this application. As shown in FIG. 9, the method mainly includes the following steps:

S901: A first device sends a secondary node add request to a second device, where the secondary node add request includes first request information.

S902: The first device and a terminal device perform a reconfiguration procedure, to assign data flows of the terminal device to the first device and the second device.

S903: After receiving the secondary node add request, the second device feeds back a secondary node add request response to the first device.

S904: The second device receives and caches a split data flow sent by the terminal device.

S905: The first device sends a request message to an AMF network element.

S906: The AMF network element requests a UPF network element to assign an uplink address to the second device.

S907: The AMF network element sends, to the first device, the uplink address assigned by the UPF network element to the second device.

S908: The first device sends second request information to the second device, where the second request information includes the uplink address assigned by the UPF network element to the second device.

S909: The second device reports the cached data flow to a core network based on the uplink address in the second request information; and stops caching the received data flow, and reports the received data flow to the core network based on the uplink address.

S910: The first device and the second device perform a data forwarding (dl data forwarding) process. To be specific, the first device forwards, to the second device, a split data flow received from the UPF network element.

According to the data flow splitting methods shown in FIG. 8 and FIG. 9, effects similar to those of the methods shown in FIG. 6 and FIG. 7 can be achieved. Details are not described again in this embodiment of this application.

Figure 10:
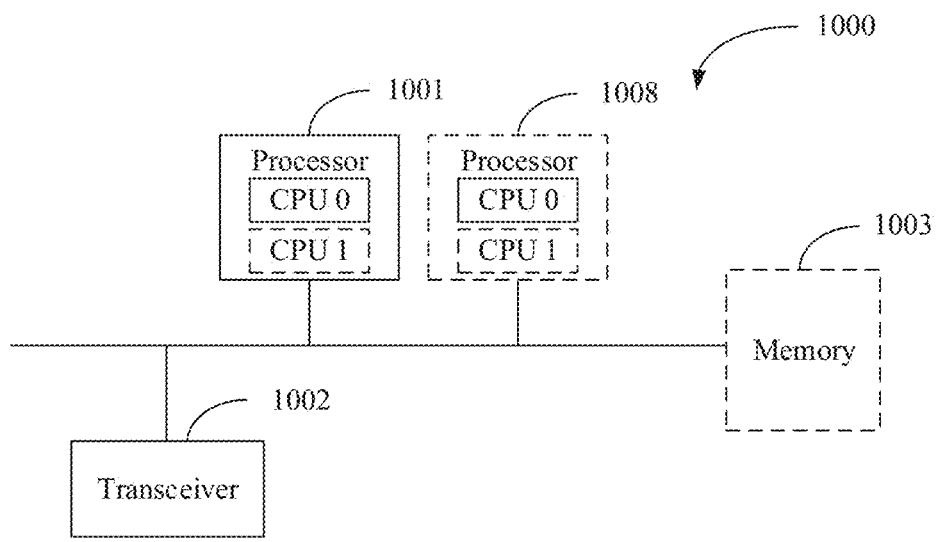
FIG. 10 shows an apparatus according to an embodiment of this application.

Based on a same technical concept, FIG. 10 is a schematic diagram of an apparatus according to an embodiment of this application. The apparatus 1000 may be a network device, or may be a system-on-a-chip or a chip, and may perform the method performed by the first device in the embodiment shown in FIG. 4.

The apparatus 1000 includes at least one processor 1001 and a transceiver 1002. Optionally, the apparatus 1000 further includes a memory 1003. The processor 1001, the transceiver 1002, and the memory 1003 are connected by using a communications bus.

The processor 1001 may be a general-purpose central processing unit (CPU), a microprocessor, an ASIC, or one or more integrated circuits configured to control program execution in the solution of the present invention.

The communications bus may include a path for transmitting information between the foregoing components.

The transceiver 1002 is configured to communicate with another device or a communications network. The transceiver may be a communications interface, for example, a wired interface, a wireless interface, or a Wi-Fi interface. Alternatively, the transceiver includes a radio frequency circuit.

The memory 1003 may be a ROM or another type of static storage device that can store static information and an instruction, or a RAM or another type of dynamic storage device that can store information and an instruction, or may be an EEPROM, a CD-ROM or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 1003 is not limited thereto. The memory 1003 may exist independently, and is connected to the processor 1001 by using the communications bus. The memory 1003 may alternatively be integrated into the processor. The memory 1003 is configured to store program code for executing the solution of the present invention, and the processor 1001 controls the execution. The processor 1001 is configured to execute the application program code stored in the memory 1003.

In a specific implementation, in an embodiment, the processor 1001 may include one or more CPUs, for example, a CPU 0 and a CPU 1 in FIG. 10.

In a specific implementation, in an embodiment, the apparatus 1000 may include a plurality of processors, for example, the processor 1001 and a processor 1008 in FIG. 10. Each of the processors may be a single-core processor (single-CPU), or may be a multi-core processor (multi-CPU). The processors herein may be one or more devices, circuits, and/or processing cores configured to process data (for example, a computer program instruction).

It should be understood that the apparatus may be configured to implement the steps performed by the network device in the method in the embodiment shown in FIG. 4. For related features, refer to the foregoing descriptions. Details are not described herein again.

Figure 11:
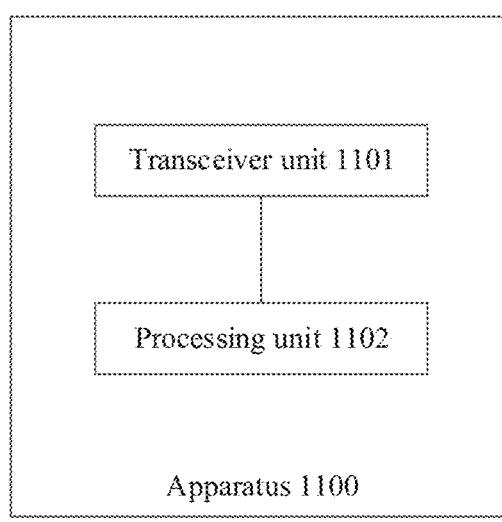
FIG. 11 shows an apparatus according to an embodiment of this application.

In this application, function modules in the apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that in this application, division into the modules is an example and is merely logical function division, and may be other division in an actual implementation. For example, when each function module is obtained through division based on each corresponding function, FIG. 11 is a schematic diagram of an apparatus. The apparatus 1100 may be the network device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the network device performs the foregoing method.

The processing unit 1101 is configured to control the communications unit 1102 to perform the following processing:

generating first indication information, where there are connections between a PDCP unit in the processing unit 1101 and at least two RLC units in a second device; and controlling the communications unit 1102 to send first indication information to the second device, where the first indication information is used to indicate the second device to stop transmission between a first RLC unit in the at least two RLC units and the PDCP unit.

In a possible implementation, the first indication information is included in a secondary node modification request (s-node modification request) message. Alternatively, the first indication information is included in a secondary node modification required (s-node modification required) message.

In a possible implementation, the first indication information includes a target data radio bearer DRB identifier; and a DRB connection corresponding to the target DRB identifier includes the connections between the PDCP unit and the at least two RLC units in the second device.

In a possible implementation, the first indication information includes first address information; and the first RLC unit is an RLC unit that is in the at least two RLC units and that transmits data between the first RLC unit and the PDCP unit by using a first address indicated by the first address information; or the first RLC unit is a preset RLC unit in the at least two RLC units.

In a possible implementation, the processing unit 1101 is further configured to:

control the communications unit 1102 to receive first response information sent by the second device after the second device stops transmission between the first RLC unit in the at least two RLC units and the PDCP unit; and release, based on the first response information, a port that is in a plurality of ports of the PDCP unit and that is used to transmit the data between the PDCP unit and the first RLC unit.

Based on a same inventive concept, the apparatus 1000 shown in FIG. 10 may alternatively be a second device, a system-on-a-chip, or a chip, and may perform the method performed by the second device in the embodiment shown in FIG. 4. For related features, refer to the foregoing descriptions. Details are not described herein again.

FIG. 11 is a schematic diagram of an apparatus. The apparatus 1100 may alternatively be the second device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the second device performs the foregoing method.

The processing unit 1101 is configured to control the communications unit 1102 to perform the following processing:

receiving first indication information sent by a first device, where there are connections between a PDCP unit in the first device and at least two RLC units in the processing unit 1101; and stopping transmission between a first RLC unit in the at least two RLC units and the PDCP unit based on the first indication information.

In a possible implementation, the first indication information is included in a secondary node modification request (s-node modification request) message. Alternatively, the first indication information is included in a secondary node modification required (s-node modification required) message.

In a possible implementation, the first indication information includes a target data radio bearer DRB identifier; and a DRB connection corresponding to the target DRB identifier includes the connections between the PDCP unit and the at least two RLC units in the second device.

In a possible implementation, the first indication information includes first address information; and the first RLC unit is an RLC unit that is in the at least two RLC units and that transmits data between the first RLC unit and the PDCP unit by using a first address indicated by the first address information; or the first RLC unit is a preset RLC unit in the at least two RLC units.

In a possible implementation, the processing unit 1101 is specifically configured to: delete transport network layer TNL information used to transmit the data between the first RLC unit and the PDCP unit; or delete the first RLC unit.

In a possible implementation, the processing unit 1101 is further configured to:

control the communications unit 1102 to send first response information to the first device, where the first response information is used to indicate the first device to release a port that is in a plurality of ports of the PDCP unit and that is used to transmit the data between the PDCP unit and the first RLC unit.

Based on a same inventive concept, the apparatus 1000 shown in FIG. 10 may alternatively be a second device, a system-on-a-chip, or a chip, and may perform the method performed by the first device in the embodiment shown in FIG. 5. For related features, refer to the foregoing descriptions. Details are not described herein again.

FIG. 11 is a schematic diagram of an apparatus. The apparatus 1100 may alternatively be the first device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the first device performs the foregoing method.

The processing unit 1101 is configured to control the communications unit 1102 to perform the following processing:

generating second indication information, where there is a connection between a PDCP unit in the processing unit 1101 and an RLC unit in a second device; and controlling the communications unit 1102 to send the second indication information to the second device, where the second indication information is used to indicate the second device to switch a working mode RLC mode of the RLC unit; and the working modes include a mode of transmitting response information and a mode of not transmitting the response information.

In a possible implementation, the second indication information is included in a secondary node modification request (s-node modification request) message. Alternatively, the second indication information is included in a secondary node modification required (s-node modification required) message.

In a possible implementation, the second indication information further includes switching manner information; and the switching manner information is used to indicate a switching manner in which the second device switches the working mode of the RLC unit.

Based on a same inventive concept, the apparatus 1000 shown in FIG. 10 may alternatively be a second device, a system-on-a-chip, or a chip, and may perform the method performed by the second device in the embodiment shown in FIG. 5. For related features, refer to the foregoing descriptions. Details are not described herein again.

FIG. 11 is a schematic diagram of an apparatus. The apparatus 1100 may alternatively be the second device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the second device performs the foregoing method.

The processing unit 1101 is configured to control the communications unit 1102 to perform the following processing:

receiving, by using the communications unit 1102, second indication information sent by a first device, where there is a connection between a PDCP unit in the first device and an RLC unit in the processing unit 1101, and switching a working mode RLC mode of the RLC unit based on the second indication information, where the second indication information is used to indicate the second device to switch the working mode RLC mode of the RLC unit; and the working modes include a mode of transmitting response information and a mode of not transmitting the response information.

In a possible implementation, the second indication information is included in a secondary node modification request (s-node modification request) message. Alternatively, the second indication information is included in a secondary node modification required (s-node modification required) message.

In a possible implementation, the second indication information further includes switching manner information; and the switching manner information is used to indicate a switching manner in which the second device switches the working mode of the RLC unit.

Based on a same inventive concept, the apparatus 1000 shown in FIG. 10 may alternatively be a second device, a system-on-a-chip, or a chip, and may perform the methods performed by the first device in the embodiments shown in FIG. 6 and FIG. 7. For related features, refer to the foregoing descriptions. Details are not described herein again.

FIG. 11 is a schematic diagram of an apparatus. The apparatus 1100 may alternatively be the first device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the first device performs the foregoing method.

The processing unit 1101 is configured to control the communications unit 1102 to perform the following processing:
obtaining an uplink address assigned by a core network to a second device; and sending flow splitting request information to the second device by using the communications unit 1102, where the flow splitting request information is used to request the second device to start to receive a split data flow and to report the received data flow to the core network based on the uplink address.

In a possible implementation, the flow splitting request information is included in a secondary node add request SN add request and/or a secondary node modification request SN modification request.

In a possible implementation, the processing unit 1101 is further configured to:
control the communications unit 1102 to send third indication information to the core network, where the third indication information is used to indicate the core network to receive the data flow sent by the second device.

Based on a same inventive concept, the apparatus 1000 shown in FIG. 10 may alternatively be a second device, a system-on-a-chip, or a chip, and may perform the methods performed by the second device in the embodiments shown in FIG. 6 and FIG. 7. For related features, refer to the foregoing descriptions. Details are not described herein again.

FIG. 11 is a schematic diagram of an apparatus. The apparatus 1100 may alternatively be the second device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the second device performs the foregoing method.

The processing unit 1101 is configured to control the communications unit 1102 to perform the following processing:
receiving, by using the communications unit 1102, flow splitting request information sent by a first device, where the flow splitting request information includes an uplink address assigned by a core network; and starting, by using the communications unit 1102 based on the flow splitting request information, to receive a data flow split by the first device, and reporting the received data flow to the core network based on the uplink address.

In a possible implementation, the flow splitting request information is included in a secondary node add request SN add request and/or a secondary node modification request SN modification request.

Based on a same inventive concept, the apparatus 1000 shown in FIG. 10 may alternatively be a first device, a system-on-a-chip, or a chip, and may perform the methods performed by the first device in the embodiments shown in FIG. 8 and FIG. 9. For related features, refer to the foregoing descriptions. Details are not described herein again.

FIG. 11 is a schematic diagram of an apparatus. The apparatus 1100 may alternatively be the first device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the first device performs the methods performed by the first device in FIG. 8 and FIG. 9.

Based on a same inventive concept, the apparatus 1000 shown in FIG. 10 may alternatively be a second device, a system-on-a-chip, or a chip, and may perform the methods performed by the first device in the embodiments shown in FIG. 8 and FIG. 9. For related features, refer to the foregoing descriptions. Details are not described herein again.

FIG. 11 is a schematic diagram of an apparatus. The apparatus 100 may alternatively be the first device in the embodiments of this application, a system-on-a-chip, or a chip. The apparatus includes a processing unit 1101 and a communications unit 1102. The processing unit 1101 may be, for example, a processor, and the communications unit 1102 may be, for example, a transceiver. The transceiver includes a radio frequency circuit. Optionally, the network device further includes a storage unit, and the storage unit may be, for example, a memory. When the network device includes the storage unit, the storage unit stores a computer executable instruction. The processing unit 1101 is connected to the storage unit. The processing unit 1101 executes the computer executable instruction stored in the storage unit, so that the first device performs the methods performed by the second device in FIG. 8 and FIG. 9.

Based on a same technical concept, an embodiment of this application further provides a computer readable storage medium. The computer readable storage medium stores a computer instruction, and when the instruction is run on a computer, the computer is enabled to perform any one of the foregoing method embodiments.

Based on a same technical concept, an embodiment of this application further provides a computer program product including an instruction, and when the computer program product runs on a computer, the computer is enabled to perform the method embodiments in the foregoing aspects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing the present invention that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

A person skilled in the art should understand that the embodiments of this application may be provided as a method, an apparatus (device), a computer readable storage medium, or a computer program product. Therefore, this application may use a form of a hardware-only embodiment, a software-only embodiment, or an embodiment with a combination of software and hardware, which are collectively referred to as "modules" or "systems" herein.

This application is described with reference to the flowcharts and/or block diagrams of the method, the apparatus (device), and the computer program product in this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although the present invention is described with reference to specific features and the embodiments thereof, it is clear that various modifications and combinations may be made to them without departing from the spirit and scope of the present invention. Correspondingly, the specification and accompanying drawings are merely example descriptions of the present invention defined by the appended claims, and are considered as any of or all modifications, variations, combinations or equivalents that cover the scope of the present invention. It is clear that a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A method used in a communications system comprising a first device and a second device, comprising:
generating, by the first device, first indication information, wherein a packet data control protocol (PDCP) entity in the first device is connected to at least two radio link control (RLC) entities in the second device respectively, the first indication information comprises at least one address assigned to the at least two RLC entities, and connections between the PDCP entity and the at least two RLC entities are used to transmit same uplink data or same downlink data;
sending, by the first device, the first indication information to the second device, wherein the first indication information indicates that configuration for transmission between a first RLC entity in the at least two RLC entities and the PDCP entity is to be de-configured;

receiving, by the second device, the first indication information; and when a quantity of the at least one address is less than the at least two RLC entities, de-configuring, by the second device, the configuration for the transmission between the first RLC entity and the PDCP entity, wherein the first device is a secondary node and the second device is a master node, or the first device is a master node and the second device is a secondary node, or the first device and the second device belong to a same base station.

2. The method according to claim 1, wherein the first indication information comprises a target data radio bearer (DRB) identifier, and wherein a DRB connection corresponding to the target DRB identifier comprises connections between the PDCP entity and the at least two RLC entities in the second device.

3. The method according to claim 1, wherein the first RLC entity is a preset RLC entity in the at least two RLC entities, and wherein the preset RLC entity is an RLC entity that sends data to the PDCP entity by using a secondary address.

4. The method according to claim 3, wherein the method further comprises:

sending, by the first device, a first address and a second address to the second device, wherein the first address is specified as a primary address, and wherein the second address is specified as the secondary address; and receiving, by the second device, the first address and the second address.

5. The method according to claim 1, wherein de-configuring the configuration for the transmission between the first RLC entity and the PDCP entity comprises:

deleting, by the second device, the first RLC entity.

6. The method according to claim 1, wherein the first indication information comprises a first address information, and the first address information indicates a second RLC entity in the at least two RLC entities which is remained to perform transmission between the PDCP entity.

7. An apparatus, applied to a first device, wherein a packet data control protocol (PDCP) entity in the first device is connected to at least two radio link control (RLC) entities in a second device respectively, and wherein the apparatus comprises:

at least one processor; and one or more memories coupled to the at least one processor and storing programming instructions for execution by the at least one processor to perform operations comprising:

generating first indication information, wherein the first indication information comprises at least one address assigned to the at least two RLC entities; and sending the first indication information to the second device, wherein the first indication information indicates that configuration for transmission between a first RLC entity in the at least two RLC entities and the PDCP entity is to be de-configured when a quantity of the at least one address is less than the at least two RLC entities, wherein connections between the PDCP entity and the at least two RLC entities are used to transmit same uplink data or same downlink data, wherein the first device is a secondary node and the second device is a master node, or the first device is a master node and the second device is a secondary node, or the first device and the second device belong to a same base station.

8. The apparatus according to claim 7, wherein the first indication information comprises a target data radio bearer (DRB) identifier, and wherein a DRB connection corresponding to the target DRB identifier comprises connections between the PDCP entity and the at least two RLC entities in the second device.

9. The apparatus according to claim 7, wherein the first RLC entity is a preset RLC entity in the at least two RLC entities, and wherein the preset RLC entity is an RLC entity that sends data to the PDCP entity by using a secondary address.

10. The apparatus according to claim 9, wherein the operations further comprise:

sending a first address and a second address to the second device, wherein the first address is specified as a primary address, and wherein the second address is specified as the secondary address.

11. An apparatus, applied to a second device, wherein a packet data control protocol (PDCP) entity in a first device is connected to at least two radio link resource (RLC) entities in the second device respectively, and wherein the apparatus comprises:

at least one processor; and one or more memories coupled to the at least one processor and storing programming instructions for execution by the at least one processor to perform operations comprising:

receiving first indication information from the first device, wherein the first indication information indicates that configuration for transmission between a first RLC entity in the at least two RLC entities and the PDCP entity is to be de-configured, and the first indication information comprises at least one address assigned to the at least two RLC entities; and when a quantity of the at least one address is less than the at least two RLC entities, de-configuring the configuration for the transmission between the first RLC entity and the PDCP entity based on the first indication information, wherein connections between the PDCP entity and the at least two RLC entities are used to transmit same uplink data or same downlink data, wherein the first device is a secondary node and the second device is a master node, or the first device is a master node and the second device is a secondary node, or the first device and the second device belong to a same base station.

12. The apparatus according to claim 11, wherein the first indication information comprises a target data radio bearer (DRB) identifier, and wherein a DRB connection corresponding to the target DRB identifier comprises connections between the PDCP entity and the at least two RLC entities in the second device.

13. The apparatus according to claim 11, wherein the first RLC entity is a preset RLC entity in the at least two RLC entities, and wherein the preset RLC entity is an RLC entity that sends data to the PDCP entity by using a secondary address.

14. The apparatus according to claim 13, wherein the operations further comprise:

receiving a first address and a second address from the first device, wherein the first address is specified as a primary address, and wherein the second address is specified as the secondary address.

15. The apparatus according to claim 11, wherein de-configuring the configuration for the transmission between the first RLC entity and the PDCP entity comprises:
 deleting the first RLC entity.

16. The apparatus according to claim 11, wherein the first device comprises a radio resource control (RRC) layer and a PDCP layer, wherein the second device comprises an RLC layer, a media access control (MAC) layer, and a physical (PHY) layer, wherein the first indication information comprises one or more second addresses assigned by the first device to RLC entities in the second device that are associated with a first data radio bearer (DRB) connection, and wherein de-configuring the configuration for the transmission between the first RLC entity and the PDCP entity comprises:
 when a quantity of the second addresses is less than a quantity of the RLC entities in the second device that are associated with the first DRB connection, de-configuring the configuration for the transmission between the first RLC entity and the PDCP entity, wherein a connection between the first RLC entity and the PDCP entity belongs to the first DRB connection.

* * * * *